(12) United States Patent
Kristiansen

(10) Patent No.: US 12,469,287 B2
(45) Date of Patent: Nov. 11, 2025

(54) COMPUTER-IMPLEMENTED METHOD AND NON- TRANSITORY COMPUTER-READABLE MEDIUM FOR GENERATING A THUMBNAIL FROM A VIDEO STREAM OR FILE, AND VIDEO SURVEILLANCE SYSTEM

(71) Applicant: MILESTONE SYSTEMS A/S, Brøndby (DK)

(72) Inventor: Morten Engel Kristiansen, Brøndby (DK)

(73) Assignee: MILESTONE SYSTEMS A/S, Brøndby (DK)

( * ) Notice: Subject to any disclaimer, the term of this patent is extended or adjusted under 35 U.S.C. 154(b) by 0 days.

(21) Appl. No.: 18/048,380

(22) Filed: Oct. 20, 2022

(65) Prior Publication Data

US 2023/0125724 A1    Apr. 27, 2023

(30) Foreign Application Priority Data

Oct. 22, 2021    (GB) ..................... 2115244

(51) Int. Cl.
*G06V 20/40*    (2022.01)
*G01S 15/42*    (2006.01)
*G06F 3/16*    (2006.01)
*G06V 20/52*    (2022.01)

(52) U.S. Cl.
CPC .............. *G06V 20/46* (2022.01); *G01S 15/42* (2013.01); *G06F 3/16* (2013.01); *G06V 20/44* (2022.01); *G06V 20/52* (2022.01)

(58) Field of Classification Search
CPC ........ G06V 20/46; G06V 20/52; G06V 20/44; G01S 15/42; G06F 3/16
See application file for complete search history.

(56) References Cited

U.S. PATENT DOCUMENTS

| | | | |
|---|---|---|---|
| 9,643,722 B1* | 5/2017 | Myslinski | G05D 1/689 |
| 10,120,536 B2* | 11/2018 | Cha | G06F 3/0483 |
| 11,064,102 B1* | 7/2021 | Helpingstine | H04W 4/022 |
| 11,282,353 B1* | 3/2022 | Fowler | G08B 13/19613 |
| 11,417,183 B1* | 8/2022 | Onofrio | G08B 13/19 |
| 2012/0127308 A1* | 5/2012 | Eldershaw | G08G 1/147 340/932.2 |
| 2013/0091432 A1* | 4/2013 | Shet | G06F 16/73 715/719 |

(Continued)

FOREIGN PATENT DOCUMENTS

| | | |
|---|---|---|
| WO | 2016/007988 A1 | 1/2016 |
| WO | 2021/167374 A1 | 8/2021 |

*Primary Examiner* — Ricky Chin
(74) *Attorney, Agent, or Firm* — Canon U.S.A., Inc. IP Division

(57) ABSTRACT

A computer-implemented method of generating a thumbnail of a video stream or file of a surveillance area in a video management system, including setting, in the video management system, at least one sound event to be detected in at least one audio stream or file corresponding to the video stream or file; detecting, in the at least one audio stream or file, at least one point in time at which the at least one sound event occurs; generating the thumbnail based on at least part of at least one frame of the video stream or file, wherein the frame is selected based on the point in time; and displaying the thumbnail in the video management system.

15 Claims, 6 Drawing Sheets

(56) References Cited

U.S. PATENT DOCUMENTS

| | | | |
|---|---|---|---|
| 2013/0176442 A1* | 7/2013 | Shuster | G06T 5/50 |
| | | | 348/207.1 |
| 2014/0362231 A1* | 12/2014 | Bietsch | G06T 7/20 |
| | | | 348/169 |
| 2015/0085114 A1* | 3/2015 | Ptitsyn | H04N 7/183 |
| | | | 348/143 |
| 2015/0106721 A1 | 4/2015 | Cha et al. | |
| 2016/0292935 A1* | 10/2016 | Patron | G07C 5/0866 |
| 2017/0223302 A1* | 8/2017 | Conlan | G08B 13/19695 |
| 2017/0223314 A1* | 8/2017 | Collings, III | G06V 10/25 |
| 2017/0228603 A1* | 8/2017 | Johnson | H04N 23/698 |
| 2017/0323540 A1* | 11/2017 | Boykin | H04N 1/00 |
| 2018/0050800 A1* | 2/2018 | Boykin | H04N 21/2368 |
| 2018/0115788 A1 | 4/2018 | Burns et al. | |
| 2018/0310698 A1* | 11/2018 | Rao | A45F 3/04 |
| 2019/0158788 A1* | 5/2019 | Mcbride | H04L 67/75 |
| 2019/0208168 A1* | 7/2019 | Collings, III | H04N 7/188 |
| 2021/0034882 A1* | 2/2021 | Johnson | G07C 9/00309 |
| 2022/0011533 A1* | 1/2022 | Matikainen | G02B 7/003 |
| 2022/0033077 A1* | 2/2022 | Myslinski | G05D 1/0088 |
| 2022/0172700 A1* | 6/2022 | Xiong | G06V 40/172 |
| 2022/0263994 A1* | 8/2022 | Kawamoto | H04N 23/60 |
| 2022/0360705 A1* | 11/2022 | Ogino | A61B 5/1171 |
| 2023/0056155 A1* | 2/2023 | Fukuda | G06F 16/784 |
| 2023/0072905 A1* | 3/2023 | Chen | H04W 4/90 |
| 2023/0093631 A1* | 3/2023 | Kim | H04N 21/235 |
| | | | 348/159 |
| 2023/0125724 A1* | 4/2023 | Kristiansen | G06V 20/52 |
| | | | 348/143 |
| 2023/0126960 A1* | 4/2023 | Ogino | H04N 23/675 |
| | | | 348/78 |
| 2023/0396741 A1* | 12/2023 | Bendtson | G08B 13/19673 |
| 2024/0054787 A1* | 2/2024 | Son | G08B 21/0476 |

\* cited by examiner

COMPUTER-IMPLEMENTED METHOD AND NON- TRANSITORY COMPUTER-READABLE MEDIUM FOR GENERATING A THUMBNAIL FROM A VIDEO STREAM OR FILE, AND VIDEO SURVEILLANCE SYSTEM

CROSS-REFERENCE TO RELATED APPLICATIONS

This application claims the benefit under 35 U.S.C. § 119(a)-(d) of United Kingdom Patent Application No. 2115244.2, filed on Oct. 22, 2021 and titled "Computer-implemented method and computer program for generating a thumbnail from a video stream or file, and video surveillance system". The above cited patent application is incorporated herein by reference in its entirety.

TECHNICAL FIELD OF THE DISCLOSURE

The present disclosure relates to a computer-implemented method and a non-transitory computer-readable medium for generating a thumbnail from a video stream or file, and to a video surveillance system. In particular, the present disclosure relates to the field of video surveillance where there is a need for processing video streams and/or files showing different objects or events of interest and generating thumbnails thereof.

BACKGROUND OF THE DISCLOSURE

Video surveillance systems generally include a large number of video cameras which record video data upon detection of an object and/or activity in the field-of-view of one or more video cameras. These video cameras are usually configured to stream video data all the time but can alternatively be activated upon detection of an object and/or activity by one or more sensors which operate all the time, and which cover a wider area than that of the video cameras. The recording by a video camera can advantageously be activated when an object and/or activity appears in a target area of the video camera and deactivated the rest of the time. More precisely, the recording by a video camera is usually based on motion detection but can also be based on object recognition, although object recognition is likely to produce a significant number of false positives (i.e. objects incorrectly considered as being other objects). Alternatively, and/or additionally, the recording may be triggered and/or stopped by an operator in a Video Management Software (VMS). Such a way of operating allows to limit the recording of video streams or files to potentially important events and to limit the storage capacity needed for operating the video surveillance system, as compared to recording video streams or files on a permanent basis.

The recorded video streams or files are generally stored in one or more recording servers and can be accessed by an operator or user who wishes to retrieve video streams or files of an object or activity of interest. The operator may rely on metadata generated by video analytics software and query the metadata with one or more search plugins to find relevant video streams or files. The one or more search plugins are advantageously able to query metadata in different databases, which can be external and/or independent from one another (or have no natural way of sharing information). Such databases may advantageously be created by different participants (e.g. partners or third parties). These different databases may advantageously comprise metadata related to the same video streams or files, e.g. one database may comprise metadata related to colors of vehicles and another database may comprise metadata related to the makes and/or models of vehicles which are detected by one or more video cameras. One database may also comprise metadata related to the weather in the video streams or files to which it relates. Alternatively, and/or additionally, the operator may also search video streams or files based on the video streams or files themselves (rather than based on metadata), for instance by running motion analysis on the video streams or files.

The metadata may also be accessed via on-demand queries over web resources, or in any other appropriate way.

The metadata can also advantageously be supplied in the form of a metadata stream in the VMS. It will be appreciated that the VMS may also be a Video Management System, in the form of a physical device or hardware running appropriate software.

It is therefore usually possible to attach (or combine or associate) metadata from different sources to video streams or files originating from a single video camera, or from different video cameras. In other words, there is in some instances no need for a one-to-one relationship between one piece of metadata and a video camera.

Many video analytics software modules are available which can analyse video surveillance data and detect specific objects or activity. These will typically attach metadata to the video stream indicating a time and position in the frame where the objects or activity have been detected, together with data describing the nature of the detected object or activity. Examples of types of objects which can be detected are people, cars, licence plates etc. Some object recognition algorithms are sophisticated enough to categorise people by age and gender, and metadata can indicate characteristics of detected objects such as colour or type of vehicle or age of a person or gender of a person. Some video analytics modules can also detect activity such as patterns of behaviour such as loitering, and these can also be indicated by metadata included in the video surveillance data and associated with the video data. Once metadata has been included in video surveillance data, it can be used to conduct searches for particular objects or events. For example, a search could be carried out for a black SUV, or a person of a particular age, gender and hair colour, or a vehicle with a particular licence plate.

Video analytics software which generate metadata can be run in various locations. Analytics software can be run on the video camera, on an analytics server, a recording server or at a client device. In a cloud-based system, video analytics may be run in the cloud.

The above solutions rely on computer and/or human vision for identifying objects and/or activity (or events) of interest in a surveillance area. This poses a risk that objects and/or activity of interest may not be detected, for instance if an algorithm does not detect an object and/or that something is happening.

Furthermore, there is sometimes a need to detect objects and/or events of interest before they are captured by a video camera.

In addition, there is a need to improve the way the video streams or files are presented (or displayed) to an operator (or user), which show objects or events of interest for the operator, whether they are captured in a live fashion (live mode) or retrieved from a video database (playback mode). There is sometimes also a need to define more relevant thumbnails for these video streams or files.

SUMMARY OF THE DISCLOSURE

The technical solutions presented in the present disclosure and appended claims aim to address at least one of the above issues, in particular by using at least one audio stream or file corresponding to a video stream or file for which a corresponding thumbnail is to be generated. In particular, the present disclosure aims to generate thumbnails which show relevant or important images with regard to sound events of interest that occur in the surveillance area. More in particular, the present disclosure aims to define a point in time (e.g. a timestamp) for generating a thumbnail based on a detection of a sound event in the surveillance area. This allows an operator to get a quick visual representation of an object and/or event of interest for him/her in a surveillance area, based on a sound associated with the object or event of interest. It is also possible to show a large number of such thumbnails, which he/she will be able to review quickly to identify whether he/she should act in relation to any objects and/or events of interest detected in the surveillance area.

Aspects of the present disclosure are set out by the independent claims.

According to a first aspect there is provided a computer-implemented method of generating a thumbnail from a video stream or file of a surveillance area in a video management system, the method comprising: setting, in the video management system, at least one sound event to be detected in at least one audio stream or file corresponding to the video stream or file; detecting, in the said at least one audio stream or file, at least one point in time at which the said at least one sound event occurs; generating the thumbnail based on at least part of at least one frame of the said video stream or file, wherein the said frame is selected based on the said point in time; and displaying the said thumbnail in the video management system.

Optionally, the method further comprises: determining a distance between a sound source that causes the sound event in the surveillance area and a video capturing device from which the said video stream or file originates; and selecting the said frame based on the said point in time and the said distance.

Optionally, selecting the said frame is based on the said point in time, on the said distance, and on a length, pitch or loudness of the said sound event or a type of the sound event.

Optionally, the method further comprises applying a time correction value to the said point in time to define a revised point in time, wherein the said frame corresponds to the said revised point in time.

Optionally, the time correction value is calculated based on the following formula:

$$\text{time correction value} = \text{base value for sound event} - \frac{\text{distance of sound source from video capturing device}}{\text{speed of sound}}$$

wherein 'base value for sound event' corresponds to a predetermined value associated with a length, pitch or loudness of the sound event or a type of the sound event; 'distance of sound source from video capturing device' corresponds to the determined distance; and 'speed of sound' corresponds to a speed at which sound travels from the said sound source towards the said video capturing device.

Optionally, the said revised point in time is calculated based on the following formula:

revised point in time=point in time+time correction value.

Optionally, the said base value is set by a user.

Optionally, when the sound event corresponds to a predetermined sound level in the said audio stream or file, the base value is set to 0.

Optionally, the method further comprises setting the base value such that when the sound event to be detected in the video management system corresponds to an accident in the surveillance area, the time correction value is a positive number.

Optionally, determining the said distance comprises determining a focal distance between the video capturing device and a point in the surveillance area where the video capturing device focuses on and setting the said distance to that focal distance.

Optionally, determining the said distance comprises using passive acoustic location.

Optionally, determining the said distance comprises triangulating a location of the said sound source using different audio capturing devices.

Optionally, when a sound arrives at one of the different audio capturing devices, the method further comprises waiting for a predetermined time before checking whether that sound has arrived at another one of the said different audio capturing devices, and if so calculating the said distance.

Optionally, determining the said distance comprises using a distance sensor configured to measure a distance between a moving object in the surveillance area that causes the said sound event and the said at least one video capturing device.

Optionally, the method further comprises storing in one or more servers, for the sound event which occurs, a type of the sound event, a time at which the said sound event is detected, and the video stream or file.

Optionally, the method further comprises calculating the said distance after a request from a user for obtaining the thumbnail.

Optionally, the said sound event corresponds to a predetermined sound level or a change in a sound level in the audio stream or file.

Optionally, the said sound event corresponds to a type of sound.

Optionally, the method further comprises displaying in or next to the thumbnail a sign indicative of the sound event or a type thereof.

Optionally, the said audio stream or file is captured by at least one audio capturing device and the said video stream or file is captured by a video camera, and the said audio capturing device is disposed for capturing sounds outside of a field-of-view of the said video camera.

Optionally, the method further comprises using a motion detection algorithm for detecting at least one event of interest in the surveillance area and at least one audio capturing device for detecting the said sound event.

Optionally, the said audio stream or file is captured by at least one audio capturing device and the said video stream or file is captured by a video camera, and the said at least one audio capturing device is attached to the said video camera in the video management system and not attached to other video cameras in the video management system.

According to a second aspect there is provided a non-transitory computer-readable medium storing a program that, when implemented by a video management system, causes the video management system to perform a method of generating a thumbnail of a video stream or file of a surveillance area in the video management system, the method comprising: setting, in the video management system, at least one sound event to be detected in at least one audio stream or file corresponding to the video stream or file; detecting, in the said at least one audio stream or file, at least one point in time at which the said at least one sound event occurs; generating the thumbnail based on at least part of at least one frame of the said video stream or file, wherein the said frame is selected based on the said point in time; and displaying the said thumbnail in the video management system.

According to a third aspect there is provided a video surveillance system comprising a video management system, an apparatus configured to generate a thumbnail of a video stream or file of a surveillance area in the video management system, a plurality of video cameras and at least one audio capturing device, the apparatus comprising one or more processors configured to: set, in the video management system, at least one sound event to be detected in at least one audio stream or file corresponding to the video stream or file; detect, in the said at least one audio stream or file, at least one point in time at which the said at least one sound event occurs; generate a thumbnail based on at least part of at least one frame of the said video stream or file, wherein the said frame is selected based on the said point in time; and display the said thumbnail in the video management system.

Optionally, the said one or more processors is or are further configured to: determine a distance between a sound source that caused the sound event and a video capturing device from which the said video stream or file originates; and select the said frame based on the said point in time and the said distance.

BRIEF DESCRIPTION OF THE DRAWINGS

Embodiments of the present disclosure will now be described, by way of example only, with reference to the accompanying drawings in which.

DETAILED DESCRIPTION OF THE DISCLOSURE

Figure 1:
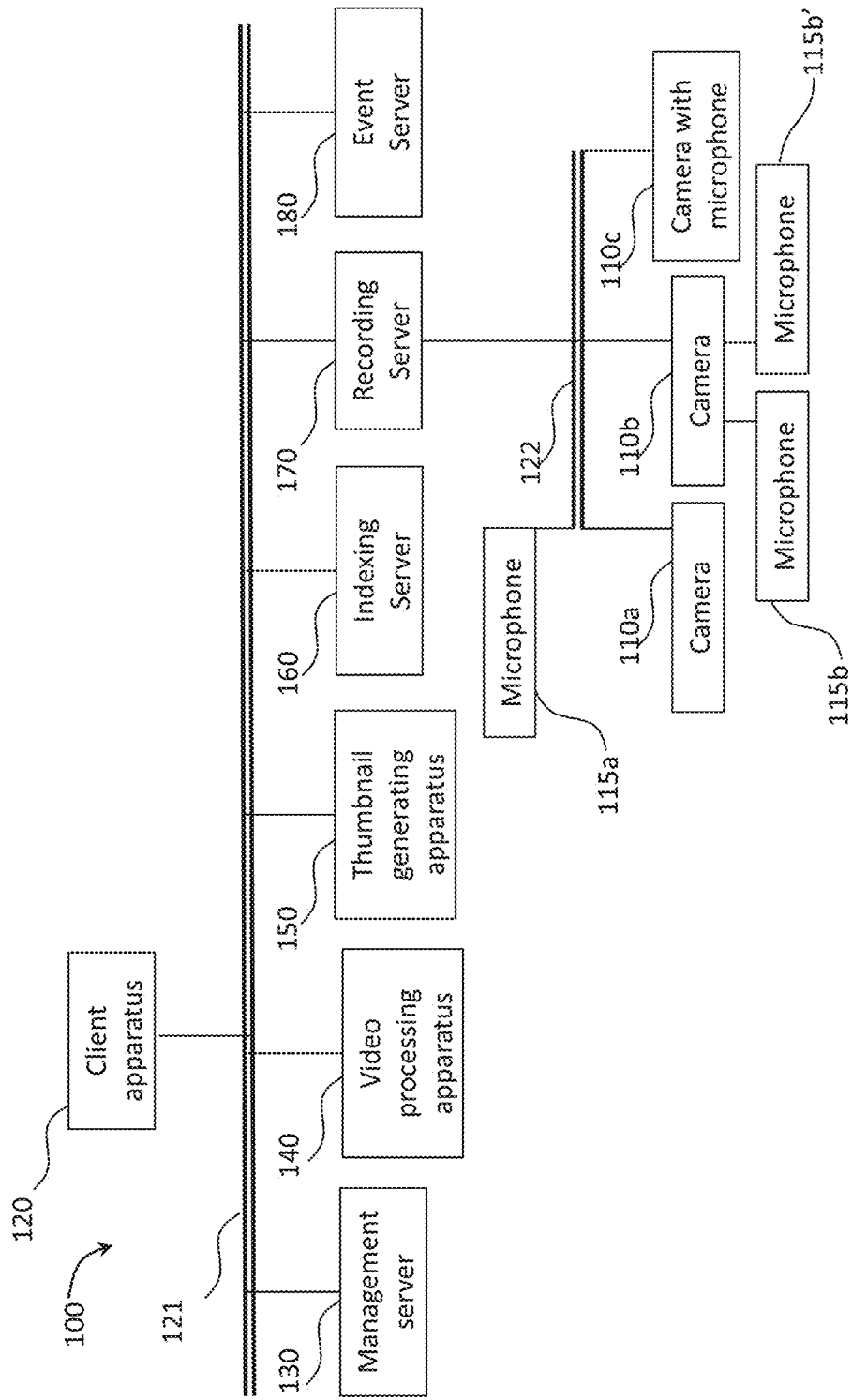
FIG. 1 schematically illustrates a first embodiment of a video surveillance system according to the present disclosure.

FIG. 1 shows an example of a first embodiment of a video surveillance system 100 according to the present disclosure. The system 100 comprises a client apparatus 120, a management server 130, a video processing apparatus 140, a thumbnail generating apparatus 150, an indexing server 160, a recording server 170, an event server 180, a plurality of video cameras 110a, 110b, 110c and a plurality of microphones 115a, 115b, 115b' connected to the recording server 170. In this embodiment, the microphone 115a captures sounds corresponding to video streams or files captured by the video camera 110a, the microphones 115b, 115b' capture sounds corresponding to the video streams or files captured by the video camera 110b and the video camera 110c has a built-in microphone. Note that the present disclosure is not limited to this configuration. One or more of the aforementioned servers or apparatuses may also be combined into a single apparatus or server. For instance, the functions of the client apparatus 120, video processing apparatus 140 and thumbnail generating apparatus 150 can be carried out by a single apparatus, for instance the client apparatus 120. Similarly, the functions of the management server 130, indexing server 160, recording server 170 and event server 180 may be carried out by a single server, for instance the recording server 170. The present disclosure is not limited to this configuration. Other servers or apparatuses may be present in the system 100. For example, an archiving server (not illustrated) may be provided for archiving older data stored in the recording server 170 which does not need to be immediately accessed from the recording server 170, but which the user does not desire to delete permanently. A fail-over recording server (not illustrated) may be provided in case a main recording server fails. An analytics server can also run analytics software for image analysis, for example motion or object detection, facial recognition, event detection. The functions of some of these apparatuses or servers may also be spread across different apparatuses or servers. For instance, the functions of the thumbnail generating apparatus 150 may be spread across the client apparatus 120 and the recording server 170.

The plurality of video surveillance cameras 110a, 110b, 110c and microphones 115, 115b, 115b' send video and audio data to the recording server 170. A client apparatus 120 is for instance a fixed terminal which provides an interface via which an operator can view video data live from the video cameras 110a, 110b, 110c, or recorded video data from the recording server 170. The client apparatus 120 preferably runs the VMS. The client apparatus 120 may also be a mobile phone or be in the form of a software program that is used to see and display video streams or files and related thumbnails. The client may also be web-based and run in a browser.

The video cameras 110a, 110b, 110c capture image data and send this to the recording server 170 as a plurality of video data streams. The microphones 115a, 115b, 115b' capture audio data and send this to the recording server 170 as a plurality of audio data streams.

The recording server 170 stores the video and audio data streams captured by the video cameras 110a, 110b, 110c and microphones 115a, 115b, 115b' as video and audio files, respectively. Alternatively, the video and audio streams could be stored in a combined fashion, e.g. as MPEG (Moving Picture Experts Group) files or combined streams. Video and/or audio data is streamed back from the recording server 170 to the client apparatus 120 depending on which live or recorded streams (or files) are selected by an operator to be viewed or listened to. Within the context of the present disclosure, the term 'video stream' should be construed as meaning a continuous flow of video data which can be received in a live mode from a video capturing device or in a playback mode from a database, and the term 'video file' should be construed as meaning a file storing video data regardless of its format. It will be appreciated that the present disclosure can likewise be used with video streams and/or video files, which may represent or be video sequences (i.e. parts of video streams or files having known start and end times). It will further be appreciated that a video stream may comprise or consist in a plurality of video files. Typically, a VMS receives video streams from one or more video cameras and/or from one or more databases located in one or more recording servers. Similarly, the term 'audio stream' should be construed as meaning a continuous flow of audio data which can be received in a live mode from an audio capturing device or in a playback mode from a database, and the term 'audio file' should be construed as meaning a file storing audio data regardless of its format. It will be appreciated that the present disclosure can likewise be used with audio streams and/or audio files, which may represent or be audio sequences (i.e. parts of audio streams or files having known start and end times). It will further be appreciated that an audio stream may comprise or consist in a plurality of audio files. Typically, a VMS receives audio streams from one or more microphones and/or from one or more databases located in one or more recording servers. It will also be appreciated that, within the context of the present disclosure, a video stream may correspond to an audio stream or an audio file, and that a video file may correspond to an audio stream or an audio file.

The client apparatus 120 is configured to communicate via a first network/bus 121 with the management server 130, the video processing apparatus 140, the thumbnail generating apparatus 150, the indexing server 160 and the recording server 170. The recording server 170 communicates with the cameras 110a, 110b, 110c via a second network/bus 122. Note that the present disclosure is not limited to these particular networks/busses 121, 122 and that the aforementioned apparatuses and servers may be connected in a different way. For instance, the client apparatus 120, video processing apparatus 140, thumbnail generating apparatus 150, indexing server 160, recording server 170 and event server 180 may be directly connected to the management server 130 which then acts as an interface between them. Alternatively, the management server 130, video processing apparatus 140, thumbnail generating apparatus 150, indexing server 160, recording server 170 and event server 180 may be directly connected to the client apparatus 120 which then acts as an interface between them.

The management server 130 includes management software for managing information regarding the configuration of the surveillance/monitoring system 100 such as conditions for alarms, details of attached peripheral devices (hardware), which data streams are recorded in which recording server, etc. The management server 130 also manages user information such as operator permissions. When a client apparatus 120 is connected to the system, or a user logs in, the management server 130 determines if the user is authorised to view video data. The management server 130 also initiates an initialisation or set-up procedure during which the management server 130 sends configuration data to the client apparatus 120. The configuration data defines the video cameras in the system, and which recording server (if there are multiple recording servers) each camera is connected to. The client apparatus 120 then stores the configuration data in a cache. The configuration data comprises the information necessary for the client apparatus 120 to identify video cameras and obtain data from video cameras and/or recording servers. Note that the present disclosure is not limited to this particular example and that the configuration data may be stored in another apparatus or server of the video surveillance system.

Object detection/recognition can be applied to the video data by object recognition software. The object recognition software generates metadata (or content metadata) which is associated with the video stream and defines where in a frame an object has been detected. The content metadata may also define what type of object or activity (event) has been detected e.g. person, car, dog, bicycle, alarm, movement. Other types of video analytics software can also generate content metadata, such as behaviour detection (e.g. loitering detection), licence plate recognition, or facial recognition.

The object detection/recognition software, or any video analytics software that generates metadata, may be run on the client apparatus 120, or on an analytics server, or on the recording server 170, or may run on a video camera itself. It is not essential to the present disclosure where the metadata is generated. The metadata may be stored in the recording server with the video surveillance data and streamed to the client apparatus with or without its associated video data.

The event server 180 runs audio analytics and detects sounds or sound events of interest in the surveillance area. When the event server 180 detects a predetermined sound event, it advantageously generates data or metadata corresponding to the sound event. The data or metadata can be generated by any appropriate piece of software known to a person skilled in the art. For instance, the data or metadata may be generated by an artificial neural network (ANN) which has been pre-trained using supervised learning, i.e. using audio files labelled with ordinary sounds (which are not of interest) and sounds corresponding to the predetermined sound events of interest to be detected.

The predetermined sound event to be detected may for instance correspond to a predetermined sound level or a change in a sound level in the audio stream or file. For instance, if we know that a sound level of 55 decibels (e.g. humans talking) is supposed to occur but suddenly drops below this level, something could be wrong, and the operator may want to be notified. The predetermined sound event may also correspond to a change (or variation) in a sound level in the audio stream or file, e.g. an increase by 30% of the sound level. Thus, the overall sound level or a difference to a noise floor may be a good indicator of an emergency.

It is also known that sound levels usually drop quickly as the distance from the sound source increases, in particular due to sound absorption by objects in the environment. Thus, it may be advantageous to also consider a distance from the sound source (for instance a distance between the sound source and a video capturing device associated with the audio stream or file) when considering a predetermined sound event corresponding to a predetermined sound level or a change in a sound level in the audio stream or file.

The predetermined sound event to be detected may also correspond to a predetermined rise time or fall time of a sound in the audio stream or file. For instance, a short rise time within a sound in the audio stream or file may be a good indicator of an emergency.

The predetermined sound event to be detected may also correspond to a type of sound, e.g. a sound of a car crash. Other examples will be given below with reference to the lists 210 and 250 in FIG. 2.

The event server 180 preferably notifies the operator of the sound event through the client apparatus 120. According to the present disclosure, this notification can be in the form of a thumbnail of a video stream or file corresponding to the audio stream or file based on which the event server 180 has detected the predetermined sound event. This notification is displayed in the video management system. It will be appreciated that the client apparatus 120 may handle such a notification in any appropriate way. For instance, the notification may be an alert sent to the operator, to prompt him/her to visualise the thumbnail. Indeed, when a sound event is detected in a live mode, it may be advantageous in some cases not to distract the operator with one or more thumbnails. For instance, when an operator monitors several live video streams, he/she may prefer or need to continue watching the live video streams for a certain period of time prior to reviewing the thumbnail(s).

A computer-implemented method of generating such a thumbnail will be described later with reference to FIG. 3.

Alternatively, or additionally, the generated data, video and/or audio metadata may be stored in one or more servers. Preferably, the thumbnails are generated and cached in the client apparatus 120 and erased after use or after a predetermined time, or when the client's cache is erased. The said one or more servers may store, for the sound event which occurs, information regarding a type of the sound event and a time at which the said sound event is detected.

The video surveillance system of FIG. 1 is only an example and other architectures are possible without departing from the present disclosure. For example, the system of FIG. 1 is an "on premises" system, but the present disclosure can also be implemented in a cloud-based system. In a cloud-based system, the video cameras stream data to the cloud, and at least the recording server 170 is in the cloud. Additionally, video analytics and/or audio analytics may be carried out in the cloud. The client apparatus requests the video data to be viewed by the user from the cloud.

The client apparatus 120 can alternatively and for instance acquire the metadata from the indexing server 160 or from the recording server 170. Alternatively, the video data acquired by the client apparatus 120 may include the video, audio and/or event metadata generated by analytics carried out elsewhere (e.g. at an analytics server, recording server or video camera).

There are further alternative ways in which the present disclosure could be implemented. For example, the search of video streams or files could be carried out at the indexing server 160 or recording server 170, with the search query being sent from the client apparatus 120.

Figure 2:
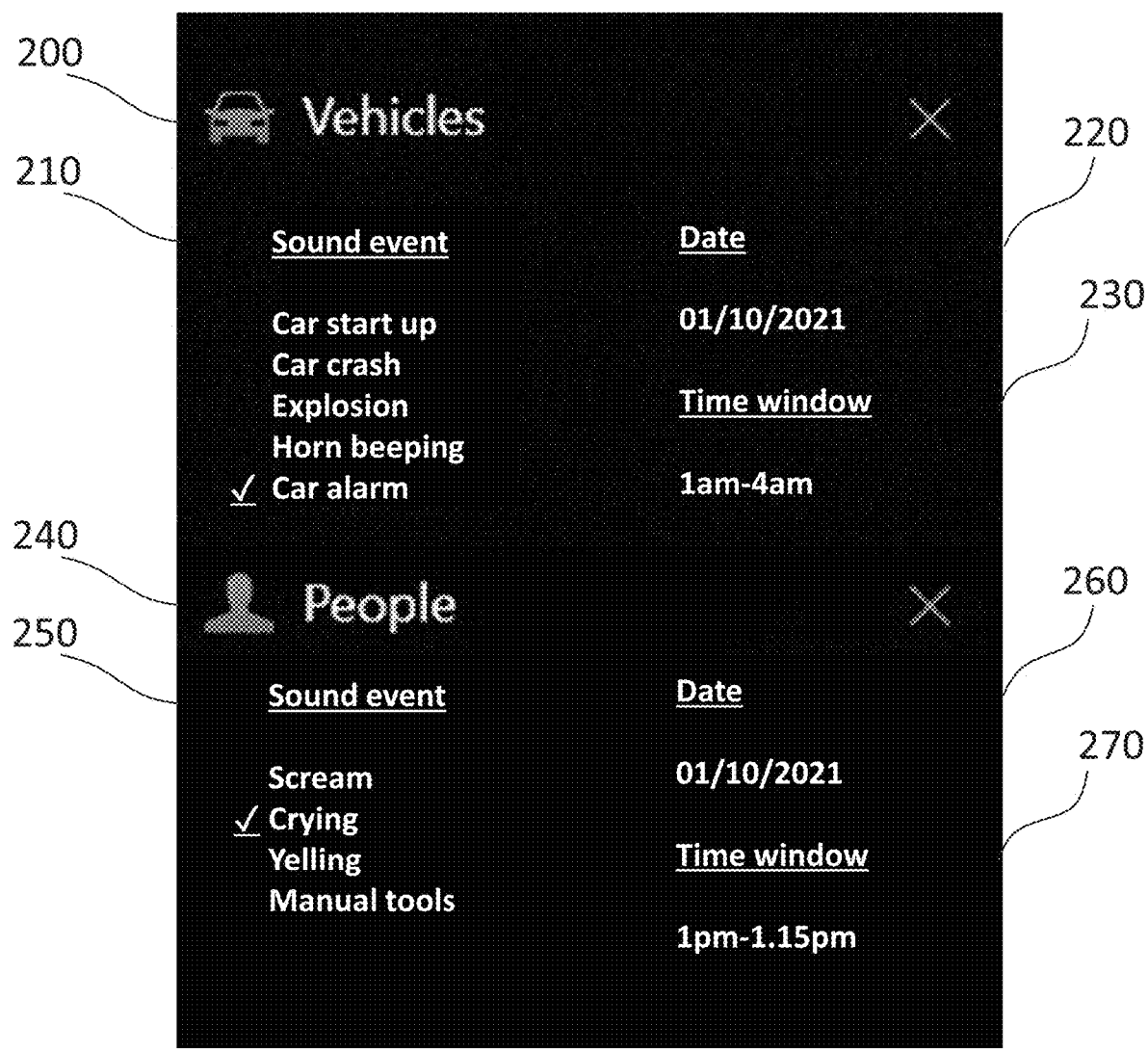
FIG. 2 illustrates a graphical user interface allowing a user to search for objects and/or events of interest in a recording server.

In the present example, the generated metadata is indexed in an organized manner on an indexing server 160 which can be queried by the user via the client apparatus 120, for instance via a graphical user interface (GUI) such as the one shown in FIG. 2.

The GUI of FIG. 2 comprises two search plugins (SPs) 200, 240, that can search for specific kinds of content in audio streams or files stored in the recording server 170 and return specific video streams or files as search results matching different search queries. Note that the present disclosure is not limited to this and that the SPs could search for content in combined video and audio streams or files. In the present example the first search plugin 200 can search for predetermined sound events 210 associated with vehicles, such as a car start up sound, a car crash sound, a car explosion sound, a car horn beeping sound, and a car alarm sound. The first search plugin 210 may allow a user to limit their search to a particular date 220 and time window 230. The second search plugin 240 can search for predetermined sound events 250 associated with people, such as a scream sound, a crying sound, a yelling sound or a sound of a person using manual tools (such as a drill). Similarly, the second search plugin 240 may allow a user to limit their search to a particular date 260 and time window 270.

The present disclosure is however not limited to this example and can involve one search plugin, more than two search plugins and/or different means for searching in audio streams or files (and/or combined video and audio streams or files, combined video and audio streams and/or combined video and audio files).

The user may search different sound events of the same type, or a combination of different types of sound events, provided the user defines at least two different search criteria. For instance, the user may search for sound events involving, at the same time, vehicles and people.

Figure 3:
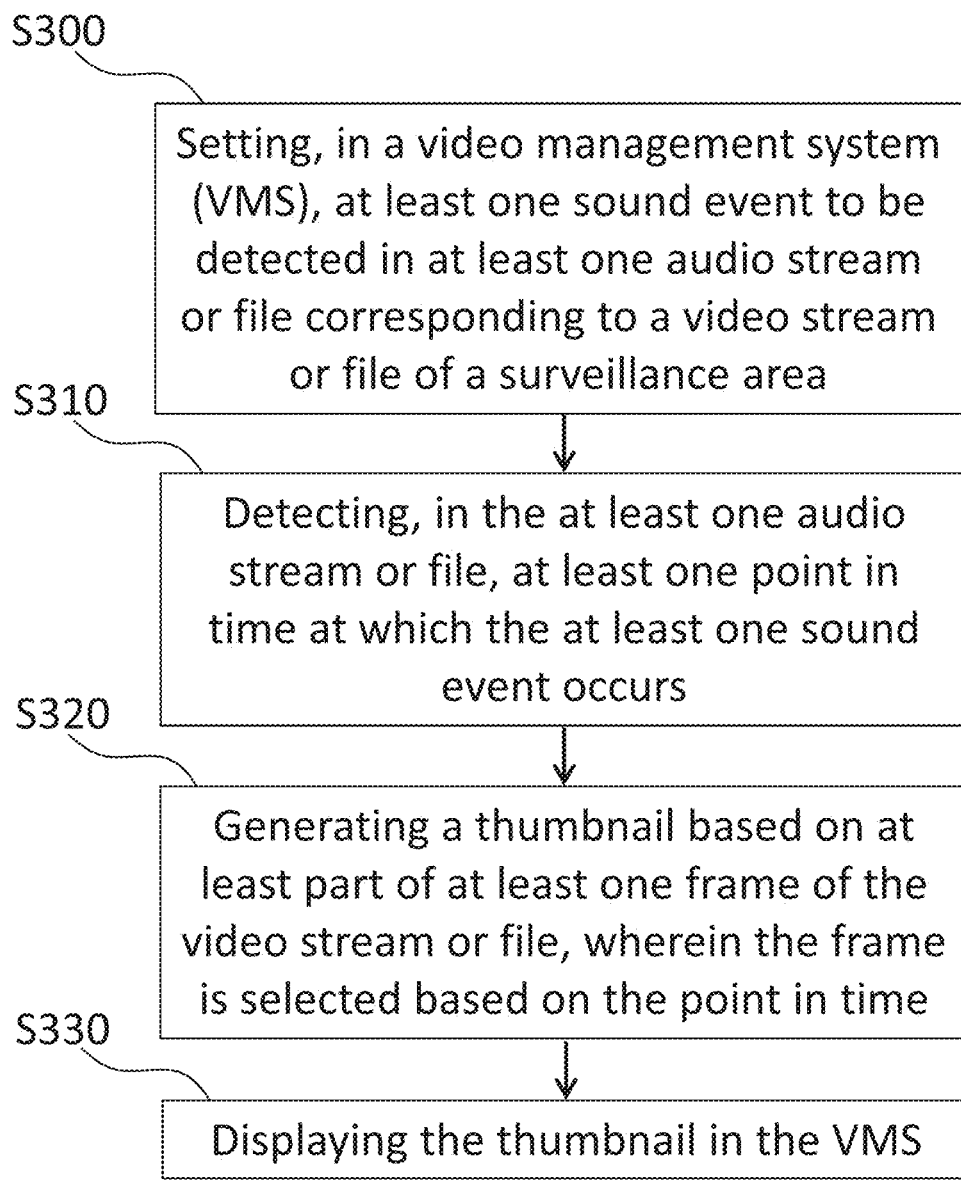
FIG. 3 is a flowchart of a first embodiment of a computer-implemented method of generating a thumbnail from a video stream or file according to the present disclosure.

FIG. 3 illustrates a flow chart of a computer-implemented method of generating a thumbnail of a video stream or file of a surveillance area in a video management system, which essentially comprises four steps.

In a first step S300, an operator will set, in the video management system, at least one sound event to be detected in at least one audio stream or file corresponding to the video stream or file. The step 300 for instance consists in selecting one or more predetermined sound events in one or more lists of sound events, such as selecting "car alarm" and "crying" in the sound event lists 210, 250 of FIG. 2. Alternatively, at least one predetermined sound event to be detected may be set by default in the VMS or set by an administrator of the VMS.

In a second step S310, one or more computers will detect, in the said at least one audio stream or file, at least one point in time at which the said at least one sound event occurs. In other words, the one or more computers which implement the method will wait for a relevant sound (predetermined sound event) to occur. This detection can be carried out in a distributed manner, for instance, using the event server 180 and indexing server 160 as described above. This detection can be carried out in real time or in a delayed manner. If no relevant sound is detected (e.g. a bird sound is detected but this does not correspond to any one of the predetermined sound events of interest for the operator), the one or more computers repeat the step S310 until a relevant sound is detected.

In a third step S320, the said one or more computers will generate a thumbnail based on at least part of at least one frame of the said video stream or file, wherein the said frame is selected based on the said point in time. This step can, for instance, be carried out by the thumbnail generating apparatus 150 described above. For instance, the thumbnail may correspond to the full frame of the video stream or file recorded at the said point in time. Alternatively, the thumbnail may correspond to a part of the frame of the video stream or file recorded at the said point in time. According to another alternative, the frame or part thereof may have been recorded at another point in time (a revised point in time), calculated based on the said point in time, as will be described more in detail below. Accordingly, the 'based on the said point in time' wording should not be construed to mean 'corresponding to the said point in time' but rather to mean that the frame is selected using the said point in time, i.e. either to directly select a frame or as a starting point to select a frame. It will be appreciated that this revised point in time comes on top of any advance/delay that may be used to synchronise the audio stream or file with the video stream or file, if need be.

Finally, in a fourth step S330, the one or more computers will display the said thumbnail in the video management system.

It will be appreciated that the steps S310 to S330 may be carried out in a live fashion, as the sound event occurs, or in a delayed manner following a search by an operator using the GUI of FIG. 2. Alternatively, the step S310 may be carried out in a live fashion and the steps S320 and S330 may be carried out in a delayed manner. According to another alternative, the steps S310 and S320 may be carried out in a live fashion and the step S330 may be carried out in a delayed manner. In particular, the thumbnail may be generated following a search or request from an operator using the GUI of FIG. 2. This corresponds to a playback mode, where the operator wishes to see thumbnails for video streams or files recorded in the past. It will be appreciated that thumbnails can be generated in live mode and/or when doing playback, provided that an audio stream or file and a corresponding video stream or file have been recorded at the same time.

The VMS and/or recording server 170 may also be configured to allow an administrator to access a management program allowing to set whether to save and/or allowing to delete all the video streams or files from a video capturing device and/or all the audio streams or files from an audio capturing device in the recording server. The operator and the administrator are typically not given the choice to delete individual video and/or audio streams or files, for security reasons. The VMS and/or recording server 170 may also be configured not to save those video and audio streams or files dismissed by the operator in the first place. The VMS and/or recording server 170 may also be configured to allow an operator to delete other pieces of data and/or metadata like video and/or audio bookmarks.

It will also be appreciated that some or preferably all of the steps S300 to S330 may be carried out in the VMS.

When it is possible to precisely locate the source of the sound event, it may be advantageous to generate the thumbnail in step S330 based on a part of one frame of the video stream or file, which corresponds to a zoomed part around the centre of the said frame, e.g. by applying a 5× or 10× zoom around the centre of the frame. It will be appreciated however that it is also possible to apply such a zoom when it is not possible to precisely locate the source of the sound event.

Figure 4:
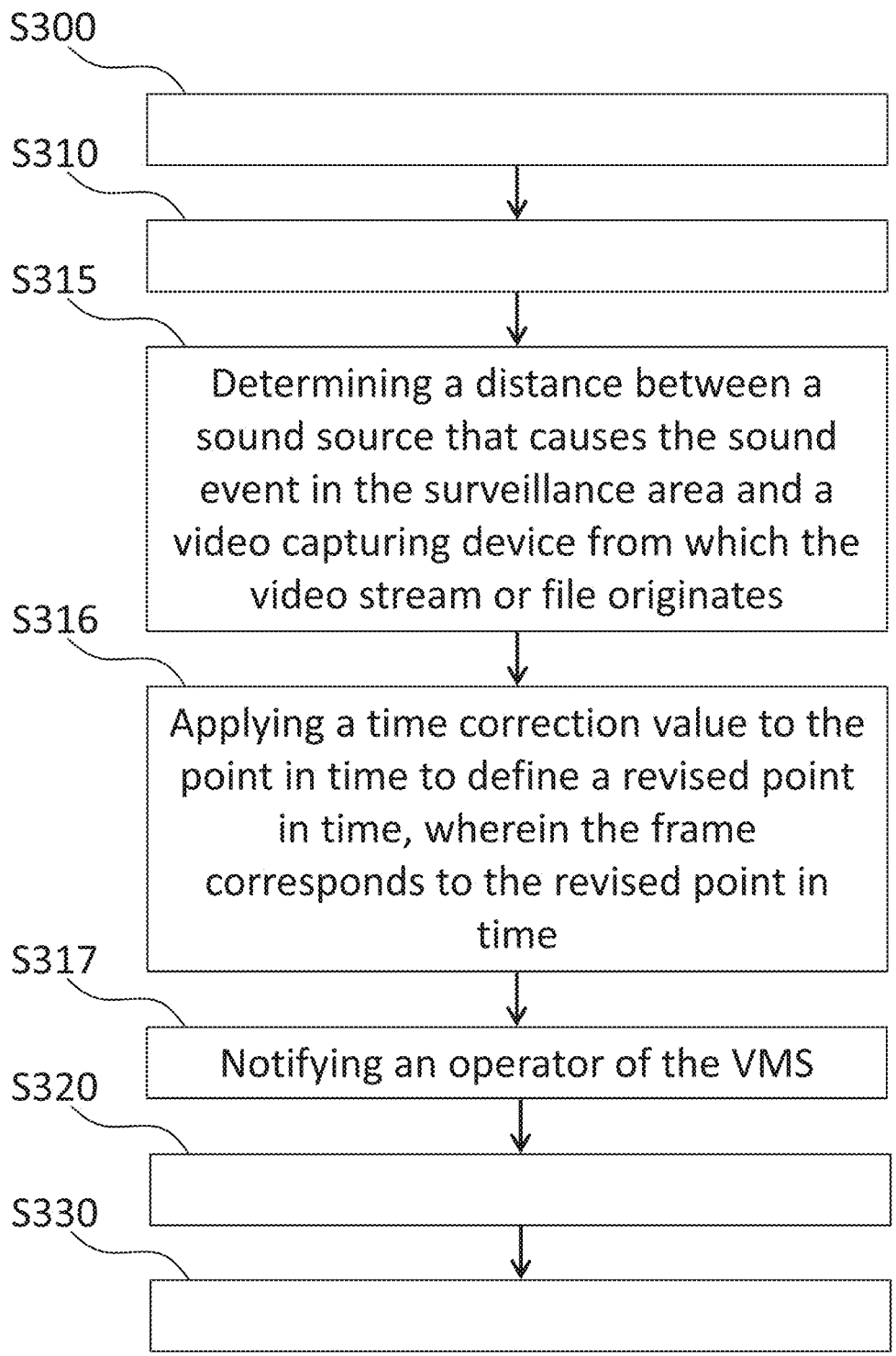
FIG. 4 illustrates a second embodiment of a computer-implemented method of generating a thumbnail from a video stream or file according to the present disclosure.

A second embodiment of the computer-implemented method of generating a thumbnail will now be described with reference to FIG. 4. Note that common steps between the methods of FIGS. 3 and 4 are given the same reference numerals and a description thereof will be omitted.

In an optional step S315, which takes place between the steps S310 and S320, the one or more computers which implement the second embodiment of the method according to the present disclosure determine a distance between a sound source that causes the sound event in the surveillance area and a video capturing device from which the said video stream or file originates. It will be appreciated that the step S315 may be carried out each time that a thumbnail is to be generated, as modern CPUs can determine such a distance between a sound source and a video capturing device in virtually no time.

The 'video capture device' may comprise one or more video cameras. In the event that the video capturing device comprises several video cameras generating the said video stream or file (e.g. several video cameras generating a panoramic video stream or file), it is possible to determine the distance in step S315 by substantially determining a distance between the sound source and a geometric median of the different video cameras (i.e. a fictious point representing a geometric centre of the different video cameras capturing the video stream or file).

The determination in step S315 can be carried out in a number of different ways. For instance, this distance may be manually input. If no precise distance can be determined, an average distance may be input corresponding to an average distance between different possible sound sources in the surveillance area and the video capturing devices from which the video stream or file originates. Using an average distance is one of the best options when only one audio capturing device (e.g. microphone) is used, when only one audio capturing device has captured the predetermined sound event in the surveillance area, and/or when only one audio capturing device is associated to a video capturing device from which the video stream or file originates.

Alternatively, determining the said distance between the sound source that causes the sound event in the surveillance area and the video capturing device from which the said video stream or file originates comprises determining a focal distance between the video capturing device and a point in the surveillance area where the video capturing device focuses on and setting the said distance to that focal distance or a corresponding value thereof. This is another one of the best options when only one audio capturing device (e.g. microphone) is used, when only one audio capturing device has captured the predetermined sound event in the surveillance area, and/or when only one audio capturing device is associated to a video capturing device from which the video stream or file originates.

As another alternative, a distance sensor may be used to detect where something moves or changes in the surveillance area and determine a distance between this moving/changing object and the video capturing device. This method cannot provide accurate results in all cases because different things could change in the surveillance area and the sound could originate from something not moving/changing in the surveillance area.

According to a preferred alternative, passive acoustic location is used to determine the said distance. This can be achieved by techniques known to the skilled person. For instance, two or more, preferably three or more audio capturing devices (e.g. microphones) located in different locations are used to triangulate a location of the sound source. This method uses the time the sound arrives at each audio capturing device and the position of each audio capturing device, which can be determined using GPS (i.e. a GPS position of each audio capturing device will be saved in one or more of the computers which implement the method, or in one or more servers and accessed by the one or more of the computers which implement the method). Before sounds are received at the different audio capturing devices, the distances between the different audio capturing devices are determined and used for determining a distance between the sound source that causes the sound event and the video capturing device.

The determination can be improved by considering factors which influence passive acoustic localization, such as whether there is a line of sight between the sound source and the video capturing device, the medium in which sound and light travel, elements and surfaces in the surveillance area (or environment) likely to reverberate sound, etc. Reverberation typically occurs in surveillance areas like carparks, airports, shopping malls, office hallways, etc. Thus, the determination can be improved by calibrating or tuning the VMS to the surveillance area, or more generally speaking by knowing the surveillance area, and for instance by taking into account one or more factors which affect sound propagation in the surveillance area.

It is thus possible to consider a distance between a sound source that causes the sound event in the surveillance area and a video capturing device from which a video stream or file originates, to select a frame of the video stream or file to be used for generating the thumbnail. Knowing that light travels faster (around 299 792 458 m/s in vacuum) than sound (around 343 m/s in air), the video capturing device will capture an event almost instantly while the audio capturing device will capture a sound related to the event with a delay (i.e. considering it will take some time for sound to arrive at the audio capturing device). (More relevent values for the speeds of light and sound may be chosen depending on a type of medium in which the audio capturing device and video capturing device are located, as explained above.) For instance, if the sound source is very far from the video capturing device, the predetermined sound event will be captured with a greater delay than when the sound source is located closer to the video capturing device.

Thus, it may be advantageous to select a frame for generating the thumbnail based on the distance between the sound source and the video capturing device. For instance, it may be advantageous to select a frame of the video stream or file recorded at a time before the sound event is detected or alternatively recorded a number of frames before the sound event is detected. As a more precise example, when the sound source is very far from the video capturing device, it is possible to select a frame of the video stream or file recorded 300 milliseconds before the sound event is detected or alternatively recorded 3 frames before the sound event is detected. Conversely, when the sound source is closer, it is possible to select a frame of the video stream or file recorded 100 milliseconds before the said point in time or 1 frame before the said point in time. The particular numbers given above (300 ms, 100 ms, 3 frames and 1 frame) are merely examples and the present disclosure is not limited thereto. This will allow to generate a thumbnail which shows the event beginning to occur, thus a relevant thumbnail for the operator. Alternatively, it is also possible to select a frame of the video stream or file recorded at a time after (e.g. 300 milliseconds after) the sound event is detected or alternatively recorded a number of frames after (e.g. 3 frames after) the sound event is detected. For instance, selecting a frame from after the said point in time will allow to generate a thumbnail which better shows an accident scene after the fact, rather than when the accident begins to occur. In other words, the frame (or part thereof) for generating the thumbnail may be selected with a certain advance/delay relative to the point in time at which the predetermined sound event is detected, i.e. based on the said point in time and the said distance between the sound source and the video capturing device.

It may also be advantageous to consider the sound event itself or a type thereof for determining which frame to select. For instance, a rise or fall time, length, pitch, or loudness of the detected sound could be used for determining which frame to select, e.g. in the event of an unusually loud sound, the one or more computers could select a frame corresponding to the said point in time as it is not known what triggered the sound. Conversely, in the event of a sound event of a known type, the one or more computers could select a frame corresponding to a predetermined advance/delay (or alternatively number of frames) relative to the said point in time. For instance and as explained above, in the event of an accident, the one or more computers could select a frame captured after the fact. Conversely, in some situations it may be advantageous to select a frame captured before the said point in time.

It may also be advantageous to associate sound events which are detected in the surveillance area with known visual metadata. For instance, if a predetermined sound event corresponding to a squealing sound of tires is detected in an audio stream or file, a piece of metadata can be coupled to the corresponding video stream or file to indicate a moving car. This piece of metadata may later be searched via one or more of the above-mentioned search plugins.

It will be appreciated that the audio capturing device and video capturing device may be located far away from each other. For instance, they can be separated by several kilometres, thanks to the high resolutions (and/or upscaled resolutions) provided by modern video cameras. For instance, a video camera may be 5 or 10 kilometres away from a microphone (virtually) attached to it in the VMS. It will also be appreciated that these millisecond advances/delays (or alternatively number of frames) can dramatically change the content of a thumbnail for events which occurs at high speed (such as car crashes).

Accordingly, in an optional step S316 which follows the optional step S315, it is possible to apply a time correction value to the said point in time, based on the distance between the sound source that causes the sound event in the surveillance area and the video capturing device from which the said video stream or file originates, based on the sound event itself (e.g. its length, pitch or loudness) and/or based on a type thereof (as explained above).

Preferably, the time correction value is calculated based on the following formula:

$$\text{time correction value} = \text{base value for sound event} - \frac{\text{distance of sound source from video capturing device}}{\text{speed of sound}}$$

wherein 'base value for sound event' corresponds to a predetermined value associated with the sound event or a type thereof. This base value can be set by a user, for instance manually input in the VMS;

'distance of sound source from video capturing device' corresponds to the determined distance between the sound source that causes the sound event in the surveillance area and the video capturing device from which the said video stream or file originates; and 'speed of sound' corresponds to a speed at which sound travels from the said sound source towards the said video capturing device.

For instance, when the sound event corresponds to a car crash, and it has been determined that the video capturing device is positioned 100 meters away from the car crash (calculated as explained above), the based value for such a sound event (car crash) can be set to 300 milliseconds (or 0.3 second) so the operator is able to determine how serious the crash is. Using the speed of sound in the air, the calculated time correction value is equal to 0.3 second−(100 meters/343 meters/second)=8.45 milliseconds (or 10 milliseconds for the sake of simplification).

A revised point in time can then be calculated using the following formula:

$$\text{revised point in time} = \text{point in time} + \text{time correction value}.$$

For instance, referring to the car crash example above, and assuming that the car crash sound was detected at 11:00:00 am, the revised point in time will be 11:00:00 am+10 milliseconds=11:00:00:010 am.

It is thus advantageous to display a thumbnail based on one frame (or part thereof) captured at 11:00:00:010 am.

In some instances, and in particular when the 'base value for sound event' is set to 0, the said revised point in time may be before the said point in time, because the time correction value is a negative number. Accordingly, the 'base value for sound event' may be set such that the frame selected for generating the thumbnail is selected before or after the point in time at which the sound even is detected. The choice of whether to select a frame before (negative time correction value) or after (positive time correction value) the said point in time will depend on the needs of the operator or of an administrator or will depend on a particular use case/scenario.

It may further be advantageous to generate two thumbnails, one corresponding for instance to the revised point in time, and the other one corresponding to the said point in time and/or to another revised point in time. For instance, in the event of an accident, and using the above car crash example, it may be advantageous to generate a thumbnail corresponding to the moment the car crash is detected (at 11:00:00 am), which corresponds to the said point in time, and another thumbnail corresponding to the revised point in time (at 11:00:00:010 am). In this way, the operator is able to determine the importance of the event by comparing the two thumbnails. The two thumbnails may be displayed in any appropriate way, for instance one after the other, as two parts of a split image or overlaid such that the operator is able to switch between them with his/her cursor.

The thumbnail(s) may advantageously include one or more bounding boxes which highlight the sound source(s) or part(s) thereof.

Next, in an optional step S317, the one or more computers may advantageously generate a notification to notify the operator that a thumbnail has been generated or can be generated, and displayed (step S320). This notification can be an alert sent to the operator as described above, to prompt him/her to visualise the thumbnail, as explained above. In this way, some or all of the generated thumbnails could be made available to the operator in a separate thumbnail library (or separate screen in the VMS) and the notification(s) could prompt the operator to check the thumbnail library. The step S317 is more advantageously implemented in a live mode rather than in a playback mode. It will be appreciated that the alert can be of any appropriate kind, for instance an audio or visual alert. It will also be appreciated that the step S317 is independent from the steps S315 and S316 and may be implemented as such in the flowchart of FIG. 3. It will further be appreciated that the steps S317 and S320 may be combined into a single step, wherein the notification is in the form of a thumbnail, as explained above.

The method of FIG. 4 then proceeds to steps S320 and S330, described above.

Figure 5:
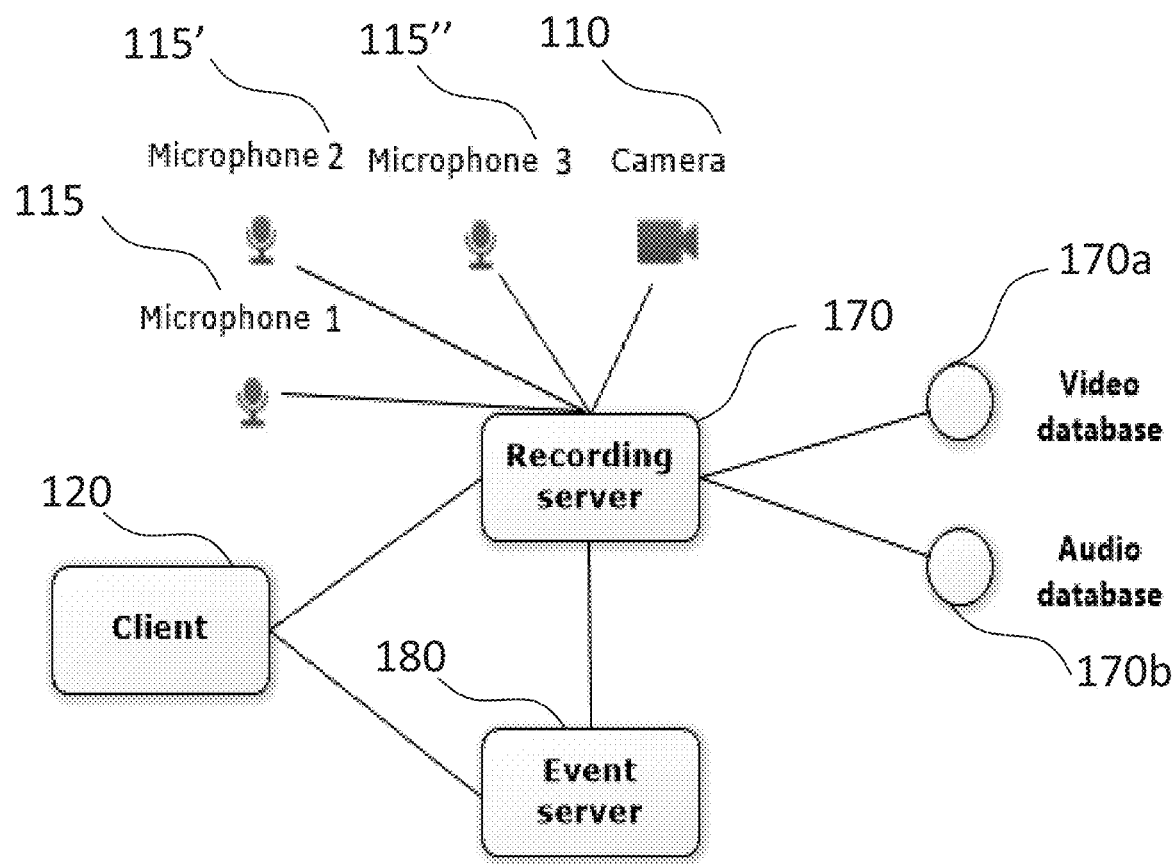
FIG. 5 illustrates a second embodiment of a video surveillance system according to the present disclosure.

FIG. 5 illustrates a second embodiment of a video surveillance system according to the present disclosure. This second embodiment mainly differs from the first embodiment of a video surveillance system of FIG. 1 by the fact that the client apparatus 120 embodies the functions of the management server 130, the video processing apparatus 140 and the thumbnail generating apparatus 150, and the recording server embodies the functions of the indexing server 160. Moreover, the system includes only one video capturing device (video camera) and three audio capturing devices (microphones 1-3) attached to the video capturing device.

Within the context of the present disclosure, the 'attached to' wording should be construed as meaning that an audio capturing devices captures sounds propagating in the surveillance area and more precisely in a field-of-view of a video capturing device to which it is attached, thus relates or corresponds to that video capturing device by capturing sounds related to its field-of-view. In other words, the 'attached to' wording should not be construed as meaning that there necessarily is a physical link or connection between the audio and video capturing devices. The relationship between the audio capturing device(s) and the corresponding video capturing device(s) may be determined and seen in the VMS.

Each audio capturing device is preferably attached to a single video capturing device (video camera) to facilitate identification of relevant video streams or files corresponding to sound events which occurs in the surveillance area. However, it is advantageous to attach several audio capturing devices to each video capturing device.

Alternatively, or additionally, it may be advantageous if the at least one audio capturing device is disposed such that it can capture sounds outside of a field-of-view of a corresponding video capturing device. This allows, for instance, the operator to detect and respond to sound events before they are visible in the video stream or file and/or on the generated thumbnail.

Alternatively, or additionally, it may be advantageous to use a motion detection algorithm for detecting at least one event of interest in the surveillance area in addition to the at least one audio capturing device for detecting the said sound event. This allows, for instance, to determine or better determine the time it takes for sound to travel to the video capturing device.

When several audio capturing devices are used in the surveillance area, it may be advantageous when a sound arrives at one of the different audio capturing devices, to wait for a predetermined time (e.g. 500 milliseconds) before checking whether that sound has also arrived at another one of the said different audio capturing devices and after that, calculating the said distance between the sound source that causes the sound event in the surveillance area and the video capturing device from which the said video stream or file originates. This is because the sound will arrive at different audio capturing devices at different times and it may efficient to triangulate a location of the sound source as described above. Note again that the present disclosure is not limited to the above example of 500 ms.

The computer-implemented method as defined in any one of the above embodiments and examples may be implemented in the form of a non-transitory computer-readable medium storing a program that, when implemented by a video management system, causes the video management system to perform a method of generating a thumbnail of a video stream or file of a surveillance area in the video management system according to the present disclosure, or may be implemented in the form of a VMS.

In the surveillance system of FIG. 5, the recording server 170 includes two databases, namely a video database 170a and an audio database 170b. The event server 180 is configured to parse the audio streams or files stored in the audio database 170b to search for predetermined sound events. It will be appreciated that the present disclosure is not limited to this configuration and that the event server 180 may be configured to detect predetermined sound events in audio streams or files before they are even recorded in the audio database 170b. In other words, the event server 180 monitors the sound events that take place. It will also be appreciated that the recording server may record video streams or files including audio streams or files, e.g. video streams or files including audio data, such as those generated by the video camera with an integrated microphone 110c. It will be appreciated that video streams or files including audio streams or files can also be generated by a video capturing device and an audio capturing device which are not part of the same device, i.e. which are separate devices as the video camera 110a and the microphone 115a. The recording server 170 may also record video and audio streams or files in a single database, or in more than two databases. In the example embodiment of FIG. 5, the camera 110 has three microphones 115, 115', 115" virtually attached to it in the VMS. It will be appreciated that the present disclosure is not limited to this specific configuration.

Figure 6:
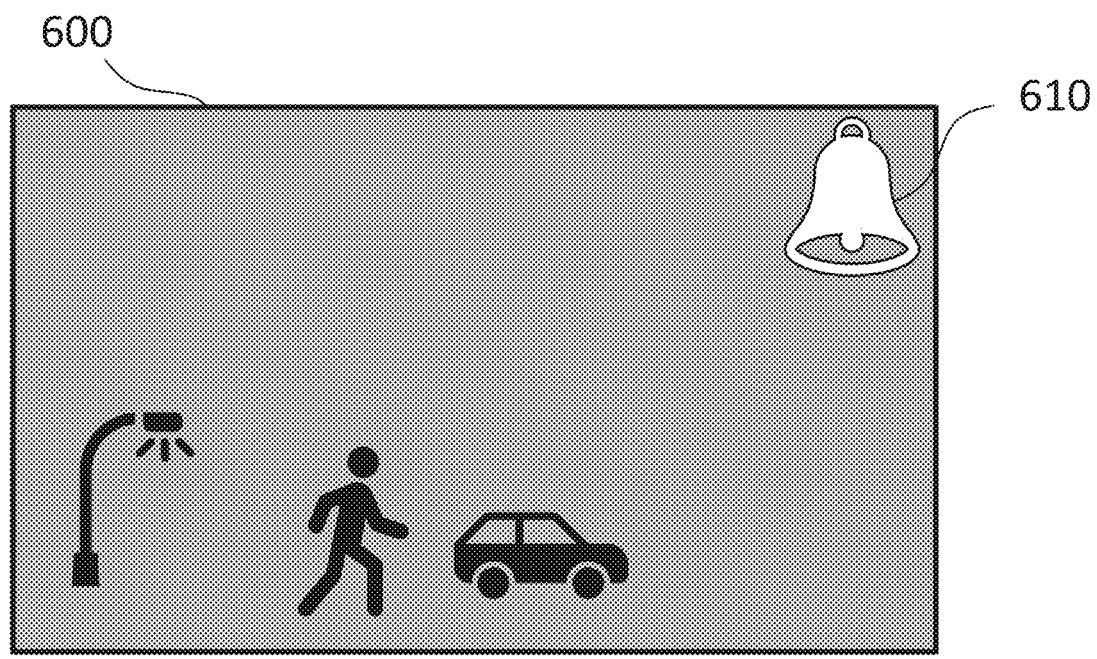
FIGS. 6 and 7 illustrate example thumbnails generated according to the present disclosure.
Figure 7:
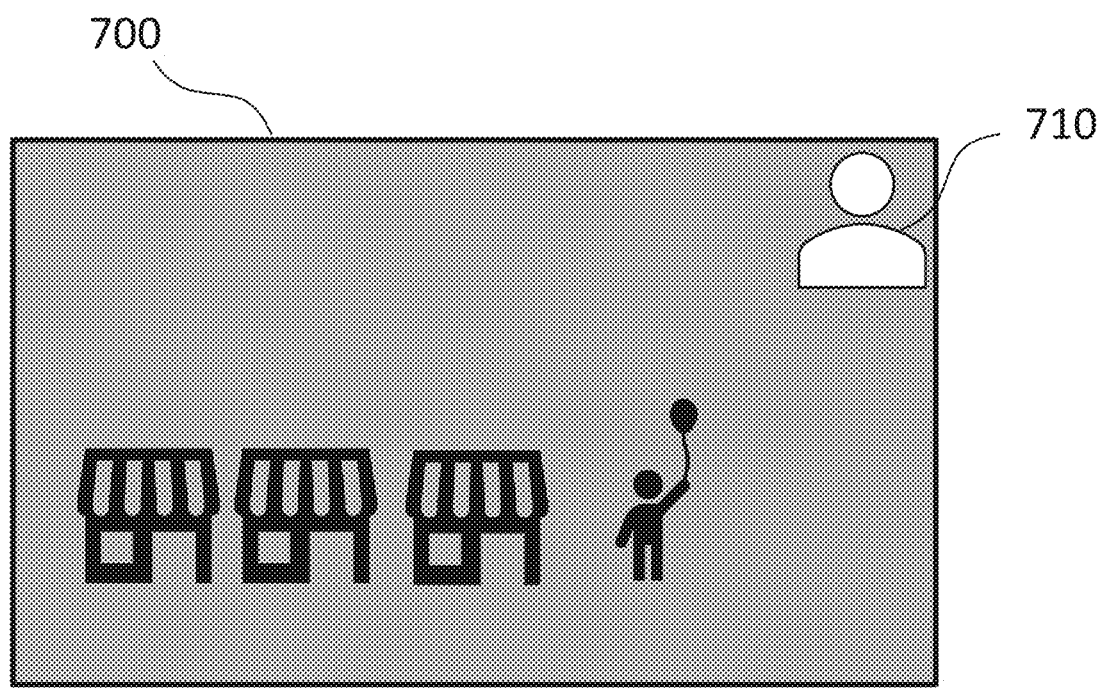

FIGS. 6 and 7 are examples of thumbnails generated according to the present disclosure. The thumbnail 600 is generated upon request by an operator using the search plugin 200 of FIG. 2. The thumbnail 600 shows a car whose car alarm has gone off and incidentally, a suspect walking nearby. The thumbnail 600 shows a sign indicative of the sound event or a type thereof, e.g. here a bell sign indicative of an alarm sound event. The thumbnail 700 shows a crying child with a balloon in a shopping mall, which was generated upon request by an operator using the search plugin 240 of FIG. 2. The thumbnail 700 shows a sign indicative of the sound event or a type thereof, e.g. here a sign indicative of a person event. The size, position and choice of sign is not limited to the above examples. For instance, the sign may be positioned next to the thumbnail rather than actually on it.

The VMS may be configured such that the audio stream or file and/or the video stream or file (or one or more parts thereof) corresponding to the thumbnail are played when the operator selects or moves his/her cursor on the thumbnail.

The thumbnails may also be colour-coded, to allow an operator to observe a large number of thumbnails and quickly identify those of particular interest for him/her. Such a colour coding may be configured by the operator in the VMS.

Different thumbnails may be displayed in different sizes, based on their importance for the operator (which can be set in the VMS).

While the present disclosure has been described with reference to various embodiments and examples, it is to be understood that the present disclosure is not limited to the disclosed embodiments and examples. The present disclosure can be implemented in various forms without departing from the principal features of the present disclosure as defined by the claims.

The invention claimed is:

1. A computer-implemented method of generating a thumbnail of a video stream or a thumbnail of a file of a surveillance area in a video management system, comprising:
    setting, in the video management system, at least one sound event to be detected in at least one audio stream or file corresponding to the video stream or file;
    detecting, in the at least one audio stream or file, at least one point in time at which the at least one sound event occurs;
    generating the thumbnail based on at least part of at least one frame of the said video stream or the thumbnail of the file, wherein the frame is selected based on the point in time;
    determining a distance between a sound source that causes the sound event in the surveillance area and a video capturing device from which the video stream or file originates;
    selecting the frame based on the point in time and the distance; and
    displaying the thumbnail in the video management system,
    wherein determining the distance comprises using passive acoustic location by triangulating a location of the sound source using different audio capturing devices, wherein when a sound arrives at one of the different audio capturing devices, the method further comprises waiting for a predetermined time before checking whether that sound has arrived at another one of the different audio capturing devices, and if so calculating the distance.

2. The computer-implemented method according to claim 1, comprising applying a time correction value to the point in time to define a revised point in time, wherein the frame corresponds to the revised point in time.

3. The computer-implemented method according to claim 2, wherein the time correction value is calculated based on the following formula:

$$\text{time correction value} = \text{base value for sound event} - \frac{\text{distance of sound source from video capturing device}}{\text{speed of sound}}$$

wherein 'base value for sound event' corresponds to a predetermined value associated with a length, pitch or loudness of the sound event or a type of the sound event;
'distance of sound source from video capturing device' corresponds to the determined distance; and
'speed of sound' corresponds to a speed at which sound travels from the sound source towards the video capturing device.

4. The computer-implemented method according to claim 3, wherein the revised point in time is calculated based on the following formula:

$$\text{revised point in time} = \text{point in time} + \text{time correction value}.$$

5. The computer-implemented method according to claim 3, wherein when the sound event corresponds to a predetermined sound level in the audio stream or file, the base value is set to 0.

6. The computer-implemented method according to claim 3, further comprising setting the base value such that when the sound event to be detected in the video management system corresponds to an accident in the surveillance area, the time correction value is a positive number.

7. The computer-implemented method according to claim 1, wherein the sound event corresponds to a predetermined sound level or a change in a sound level in the audio stream or file.

8. The computer-implemented method according to claim 1, wherein the sound event corresponds to a type of sound.

9. The computer-implemented method according to claim 1, wherein the audio stream or file is captured by at least one audio capturing device and wherein the video stream or file is captured by a video camera, and wherein the audio capturing device is disposed for capturing sounds outside of a field-of-view of the video camera.

10. The computer-implemented method according to claim 1, further comprising using a motion detection algorithm for detecting at least one event of interest in the surveillance area and at least one audio capturing device for detecting the sound event.

11. The computer-implemented method according to claim 1, wherein the audio stream or file is captured by at least one audio capturing device and wherein the video stream or file is captured by a video camera, and wherein the at least one audio capturing device is attached to the video camera in the video management system and not attached to other video cameras in the video management system.

12. The computer-implemented method according to claim 1, wherein selecting the frame is based on the point in time, on the distance, and on a length, pitch or loudness of the sound event or a type of the sound event.

13. The computer-implemented method according to claim 1, wherein determining the distance comprises determining a focal distance between the video capturing device and a point in the surveillance area where the video capturing device focuses on and setting the distance to that focal distance.

14. A non-transitory computer-readable medium storing a program that, when implemented by a video management system, causes the video management system to perform a method of generating a thumbnail of a video stream or a thumbnail of a file of a surveillance area in the video management system, the method comprising:
   setting, in the video management system, at least one sound event to be detected in at least one audio stream or file corresponding to the video stream or file;
   detecting, in the at least one audio stream or file, at least one point in time at which the at least one sound event occurs;
   generating the thumbnail based on at least part of at least one frame of the video stream or the thumbnail of the file, wherein the frame is selected based on the point in time;
   determining a distance between a sound source that causes the sound event in the surveillance area and a video capturing device from which the video stream or file originates;
   selecting the frame based on the point in time and the distance; and
   displaying the thumbnail in the video management system,
   wherein determining the distance comprises using passive acoustic location by triangulating a location of the sound source using different audio capturing devices,
   wherein when a sound arrives at one of the different audio capturing devices, the method further comprises waiting for a predetermined time before checking whether that sound has arrived at another one of the different audio capturing devices, and if so calculating the distance.

15. A video surveillance system comprising a video management system, an apparatus configured to generate a thumbnail of a video stream or a thumbnail of a file of a surveillance area in the video management system, a plurality of video cameras and at least one audio capturing device, the apparatus comprising one or more processors configured to:
   set, in the video management system, at least one sound event to be detected in at least one audio stream or file corresponding to the video stream or file;
   detect, in the at least one audio stream or file, at least one point in time at which the at least one sound event occurs;
   generate a thumbnail based on at least part of at least one frame of the video stream or the thumbnail of the file, wherein the frame is selected based on the point in time;
   determine a distance between a sound source that causes the sound event in the surveillance area and a video capturing device from which the video stream or file originates;
   select the frame based on the point in time and the distance; and
   display the thumbnail in the video management system,
   wherein determining the distance comprises using passive acoustic location by triangulating a location of the sound source using different audio capturing devices,
   wherein when a sound arrives at one of the different audio capturing devices, the method further comprises waiting for a predetermined time before checking whether that sound has arrived at another one of the different audio capturing devices, and if so calculating the distance.

* * * * *